United States Patent Office 2,899,426
Patented Aug. 11, 1959

2,899,426

SYNTHESIS OF 1,3-DIAZACYCLOALKENE-2

Barry M. Bloom, Jackson Heights, N.Y., assignor to Chas. Pfizer & Co., Inc., New York, N.Y., a corporation of Delaware No Drawing. Application October 18, 1956
Serial No. 616,640

4 Claims. (Cl. 260—239.5)

This invention is concerned with a method of preparing 2-(N-substituted)-1,3-diazacycloalkene-2 and the acid addition salts thereof.

The process of this invention produces compounds which are useful as accelerators in the vulcanization of rubber. When used for this purpose about one to two parts by weight of a diazacycloalkene may be milled with one hundred parts of rubber, three to five parts of sulfur, five parts of zinc oxide and the mixture vulcanized under about three to four atmospheres of pressure. The product produced thereby has high tensile strength and great elasticity.

Certain of the compounds which can be prepared using the process of this invention are useful as regulators of the central nervous system. In my copending and concurrently filed patent applications entitled, "Therapeutic Compositions," Serial No. 616,643 now abandoned; "Naphthylamino-1,3-Diazacycloalkene," Serial No. 616,642, now abandoned; and "Therapeutic Agents," Serial No. 616,639, now Patent No. 2,876,229, I describe the use of certain salts of substituted 2-(naphthylamino)-1,3-diazacyclopentene-2 as pressor amines, the use of substituted naphthylamino-1,3-diazacyclopentenes-2 and their pharmaceutically acceptable acid addition salts as hypotensive agents, and the use of substituted and unsubstituted tetrahydroquinoline and tetrahydroisoquinoline derivatives of diazacyclopentenes-2 and their pharmaceutically acceptable acid addition salts as hypotensive agents. In my copending and concurrently filed patent applications entitled, "2-Naphthylamino-1,3-Diazacyclohexene-2," Serial No. 616,641, now abandoned, and "1,2,3,4-Tetrahydroquinolyl, and 1,2,3,4-Tetrahydroisoquinolyl Derivatives of 1,3-Diazacyclohexene-2," Serial No. 616,594, now Patent No. 2,876,222, respectively, I describe the use of substituted and unsubstituted naphthylamino, and 1,2,3,4-tetrahydroquinolyl derivatives as well as 1,2,3,4-tetrahydroisoquinolyl derivatives of 1,3-diazacyclohexene-2 and their pharmaceutically acceptable acid addition salts as pressor amines.

In the novel process of this invention, which is especially useful because of the high yields which can be obtained, and because it is readily adaptable to industrial procedures, an isothiouronium salt, which in the usual case is either a hydrochloric, hydrobromic, hydriodic, sulfuric or sulfonic acid salt, such as p-toluenesulfonic acid or methanesulfonic acid, is reacted, under certain conditions, with a diamino compound as more fully described hereinafter. The diazacycloalkene compound which results from this reaction is obtained as an acid addition salt. The free base is obtained by treatment of the acid addition salt with an alkaline reagent preferably an inorganic base such as an aqueous solution of sodium hydroxide, potassium hydroxide, sodium carbonate, potassium carbonate, sodium bicarbonate, potassium bicarbonate, lithium carbonate, calcium oxide or other obvious equivalent. The free base may then be isolated by extraction from the aqueous solution with a volatile hydrocarbon or halogenated hydrocarbon solvent such as for example, benzene, toluene, petroleum ether, ligroin, chloroform, carbon tetrachloride, ethylene chloride, or methylene chloride.

The isothiouronium salts which are employed in accordance with this invention may be prepared by procedures known to those skilled in the art. They are prepared, for example, by the reaction of an alkyl or aralkyl halide, sulfate, or sulfonate with thiourea or a derivative thereof. Thiourea itself can be prepared by heating ammonium thiocyanate or by the reaction of hydrogen sulfide with cyanamide. Thiourea derivatives may be prepared by heating amine thiocyanates, by the reaction of alkyl isothiocyanates with amines, by the reaction of aromatic amines with carbon disulfide, by heating the amine salts of dithiocarbamic acid and by the reaction of amines with thiophosgene. I have found that it is particularly convenient to prepare a thiourea derivative for the purpose of my invention by reacting a primary or a secondary amine with ammonium thiocyanate in the presence of a halogen acid.

The process of this invention is applicable to a wide variety of isothiouronium halides, sulfates and sulfonates. It can be used for the preparation of 2-amino-1,3-diazacycloalkene-2 by the reaction between a diamino compound and an isothiouronium salt in which both of the hydrogens on the number one nitrogen atom are present. It can be used to prepare a N-substituted compound by utilizing an isothiouronium salt in which one and/or both of the hydrogens on the number one nitrogen atom is replaced with an alkylene, alkyl, aralkyl, aralkylene or aryl group, the total number of carbon atoms in said group and/or groups being up to thirty carbon atoms. It is also applicable when the number one nitrogen atom is the nitrogen atom of a heterocyclic system such as piperidine, piperazine, 1,2,3,4,-tetrahydroarmane, 1,2,3,4-tetrahydroquinoline, 1,2,3,4-tetrahydroisoquinoline, morpholine and others.

Although the process is useful for preparing other ring systems the usual application of the process of this invention is in the preparation of five and six membered rings, such as 1,3-diazacyclopentene-2 and 1,3-diazacyclohexene-2. Therefore, the diamino compound chosen will be one containing from two to three carbon atoms in a saturated chain between the amino groups. The following list is illustrative of some of the products which can be prepared using the process of my invention.

2-hexylamino-1,3-diazacyclopentene-2.
2-(3',5'-dichloro-1'-naphthylamino)-4-n-propyl-1,3-diazacyclohexene-2.
2-(1'-naphthylamino)-5-thioethyl-1,3-diazacyclohexene-2.
2-(1',2',-3',4'-tetrahydro-6',7'-di-n-butyl-2'-isoquinolyl)-4,5-di-n-butyl-1,3-diazacyclohexene-2.
2-(1',2',3',4'-tetrahydro-6'-hydroxy-2'-isoquinolyl)-1,3-diazacyclohexene-2.
2-(2',5',7'-trithiomethyl-1'-naphthylamino) - 1,3 - diazacyclohexene-2.
2-(3',4'-dibromo-phenylamino)-4,5,6-triethyl - 1,3 - diazacyclohexene-2.
2-(2',4',6'-trithiopropyl-phenylamino) - 1,3 - diazacyclohexene-2.
2-(2',4',6'-trithiomethyl-phenylamino) - 1,3 - diazacyclopentene-2.
2-(1',2',3',4'-tetrahydro-3'-ethyl-2'-isoquinolyl)-4 (or 5) ethyl-1,3-diazacyclopentene-2.
2-(1',2',3',4'-tetrahydro-6',7'-di-n-butyl-2'-isoquinolyl)-4,5-di-n-butyl-1,3-diazacyclopentene-2.
2-(3',5'-dichloro-1'-naphthylamino)-4,5-di-isopropoxy - 1,3-diazacyclopentene-2.
2-(1',3',5',7'-tetrachloro-2'-naphthylamino) - 1,3 - diazacyclopentene-2.
2-(4'-aceto-benzylamino)-1,3-diazacyclopentene-2.

2-(N-octyl-ethylamino)-1,3-diazacyclopentene-2.
2-(1',2',3',4'-tetrahydro-8'-bromo-2'-isoquinolyl)-4-methyl-1,3-diazacyclohexene-2.
2-(1',2',3',4'-tetrahydro-2'-n-butyl-1'-quinolyl)-1,3 - diazacyclohexene-2.
2-(3',4',5'-trimethoxy-1'-naphthylamino)-1,3 - diazacyclopentene-2.
2-(N-methyl-1'-naphthylamino)-1,3-diazacyclopentene-2.
2-(1',2',3',4'-tetrahydro-2'-n-butyl-1'-quinolyl) - 1,3 - diazacyclopentene-2.
2-(1',2',3',4'-tetrahydro-6'-n-propyl-1'-quinolyl) - 1,3 - diazacyclopentene-2.
2-(N-methyl-phenylamino)-1,3-diazacyclopentene-2.
2-(2'-iodo-phenylamino)-5,5-diethyl-diazacyclopentene-2.
2-(2',4'-dichloro-phenylamino)-1,3-diazacyclopentene-2.
2-(2',4'-diethoxy-phenylamino)-1,3-diazacyclohexene-2.
2-(2',4',6'-trithiomethyl-phenylamino) - 1,3 - diazacyclohexene-2.
2-(1',3',7'-tri-n-butyl-2'-naphthylamino)-1,3 - diazacyclohexene-2.
2-(3',5'-dithiopropyl-1'-naphthylamino)-1,3 - diazacyclohexene-2.
2-(1'-morpholino)-1,3-diazacyclohexene-2.
2-(1',2',3',4'-tetrahydroquinolyl)-1,3-diazacyclopentene-2.
2-(N-decyl-6',7'-di-n-pentyl-1'-naphthylamino) - 1,3 - diazacyclopentene-2.
2-(2'-acetylamino-1'-piperidino)-1,3-diazacyclopentene-2.
2-(1'-naphthylamino)-1,3-diazacyclohexene-2.
2-(4'-cyano-2'-naphthylamino)-1,3-diazacyclopentene-2.
2-(phenylamino)-5-hydroxy-1,3-diazacyclohexene-2.
2-(phenylamino)-4,5-di - isopropyl - 1,3 - diazacyclopentene-2.
2-(1',2',3',4'-tetrahydro-8'-bromo-2'-isoquinolyl)-4(or 5)-methyl-1,3-diazacyclopentene-2.
2-(2',3'-di-n-butyl-1' - naphthylamino) - 1,3 - diazacyclopentene-2.
2-(1',2',3',4'-tetrahydro-6',7'-dibromo-1'-quinolyl) - 4-isopropyl-1,3-diazacyclohexene-2.
2-cyclohexylamino-1,2-diazacyclopentene-2.
2-(4'-mercapto-1',2',3',4'-tetrahydro-1'-quinolyl) - 1,3-diazacyclohexene-2.
2-(1',2',3',4'-tetrahydro-8'-iodo-1'-quinolyl) - 5-hydroxy-1,3-diazacyclohexene-2.
2-(2'-naphthylamino)-4,5-di-sec-butyl - 1,3 - diazacyclopentene-2.
2-(1',2',3',4'-tetrahydro-2'-isoquinolyl) - 1,3 - diazacyclopentene-2.
2-(2',4'-dihydroxy-phenylamino)-1,3-diazacyclopentene-2.
2-(2',4'-diiodo-phenylamino)-1,3-diazacyclohexene-2.
2-(2',5'-diiodo-1'-naphthylamino)-1,3-diazacyclohexene-2.
2-(phenylamino)-4,5-dipropoxy-1,3-diazacyclopentene-2.
2-(N-heptyl-methylamino)-1,3-diazacyclohexene-2.
2-(1',2',3',4'-tetrahydro-6',7'-dihydroxy - 1' - quinolyl)-1,3-diazacyclohexene-2.
2-(3',4'-dichloro-1' - naphthylamino) - 1,3 - diazacyclopentene-2.
2-(1',2',3',4'-tetrahydro-6',7'-dibromo-1'-quinolyl) - 4(or 5)isopropyl-1,3-diazacyclopentene-2.
2-(phenylamino)-4,5-dimethyl-1,3-diazacyclopenetene-2.
2-(2',4'-di-n-butyl-phenylamino)-1,3-diazacyclohexene-2.
2-(2'-naphthylamino)-4,5-di-sec-butyl - 1,3 - diazacyclohexene-2.
2-(2',6'-diethoxy-1' - naphthylamino) - 1,3 - diazacyclohexene-2.
2-(1',2',3',4'-tetrahydro-2'-isoquinolyl)-5-bromo - 1,3 - diazacyclohexene-2.
2-(1'-piperidino)-1,3-diazacyclohexene-2.
2-(1',3',5',7'-tetrachloro-2'-naphthylamino) - 1,3 - diazacyclohexene-2.
2-(1',2',3',4'-tetrahydro-2'-isoquinolyl)-4,6-diethyl-1,3-diazacyclohexene-2.
2-(1',3',7'-tri-n-butyl-2'-naphthylamino)-1,3 - diazacyclopentene-2.
2-(1',2',3',4'-tetrahydro-6',7'-diethoxy-1' - quinolyl) - 1,3-diazacyclopentene-2.

2-(2',4',6'-trithiopropyl-phenylamino) - 1,3 - diazacyclopentene-2.
2-(2',4',6'-tripropoxy - phenylamino) - 1,3 - diazacyclohexene-2.
2-(2',3',4',5',6'-pentaethyl-phenylamino)-1,3 - diazacyclohexene-2.
2-cyclobutylamino-1,2-diazacyclohexene-2.
2-(2',6'-di-n-butyl-phenylamino)-1,3-diazacyclohexene-2.
2-(3',4'-dibromo-phenylamino)-4-ethyl - 1,3 - diazacyclopentene-2.
2-(1',2',3',4'-tetrahydro-5'-methoxy-2'-isoquinolyl) - 1,3-diazacyclopentene-2.
2-(3',5'-dithiopropyl-1'-naphthylamino)-1,3 - diazacyclopentene-2.
2-(1',2',3',4'-tetrahydro-1-methyl-2'-isoquinolyl) - 1,3 - diazacyclohexene-2.
2-(3',4'-dichloro-2'-naphthylamino)-4,5,6-trimethyl - 1,3-diazacyclohexene-2.
2-cyclopentylamino-1,3-diazacyclohexene-2.
2-(1'-naphthylamino)-5-cyano-1,3-diazacyclohexene-2.
2-(1',2',3',4'-tetrahydro-6'-n-propyl-1'-quinolyl) - 1,3-diazacyclohexene-2.
2-(1',3'-dihydroxy-2'-naphthylamino) - 1,3 - diazacyclopentene-2.
2-(1',2',3',4'-tetrahydro-3',4'-diethyl-2'-isoquinolyl) - 4,5-diethyl-1,3-diazacyclopentene-2.
2-(2',4'-diiodo-phenylamino)-1,3-diazacyclopentene-2.
2-(N-n-butyl-phenylamino)-1,3-diazacyclohexene-2.
2-(1'-naphthylamino)-4,5-di-isopropyl - 1,3 - diazacyclohexene-2.
2-propylamino-1,3-diazacyclohexene-2.
2-(1',2',3',4'-tetrahydro-2'-methyl-1'-quinolyl) - 4,5 - di-n-propyl-1,3-diazacyclohexene-2.

The equation below illustrates the preparation of an acid addition salt of 2-(phenylamino)-1,3-diazacyclohexene-2, one of the compounds which can be prepared by the process of my invention.

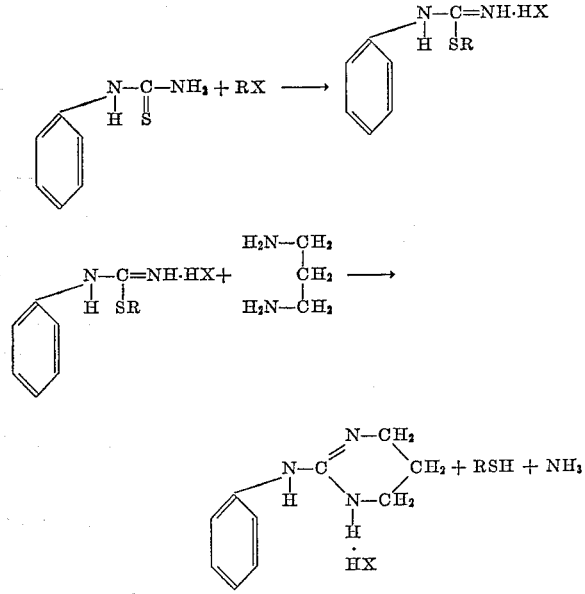

By reference to the above equation it can be seen that the size of the alkyl or aralkyl group, here represented by "R," in the halide, sulfate, or sulfonate used to form the isothiouronium salt if of no consequence as far as the final structure of the active compounds of my invention is concerned since it is ultimately removed in the form of a mercaptan. It is, however, convenient to use low molecular weight halides, sulfates of sulfonates such as the methyl compounds since the mercaptans which are ultimately formed from these types of compounds are volatile and easily removed.

The symbol "X" in the above equation refers to a halide, sulfate or sulfonate group.

The process of this invention is applicable when the groups which replace a hydrogen and/or hydrogens on the number one nitrogen atom of the isothiouronium salt are substituted with alkyl, alkoxy, thioalkyl, hydroxyl, mercapto, halogen, cyano, carbonyl, acylamino and other groups. It is, however, best to avoid strongly acid groups particularly those which give a hydrogen ion concentration of ten to the minus three moles per liter or higher such as the sulfonic acid group or the phosphonic acid group. The carbon atoms of the diamino compound can also be substituted with groups such as those listed above but a carbon atom adjacent to the amino group should not be substituted with hydroxyl groups nor should any diamino compound when dissolved in water give a hydrogen ion concentration greater than ten to the minus three moles per liter.

It is apparent, therefore, that the isothiouronium salts of this invention can be defined as isothiouronium halides, sulfates or sulfonates free of acid substituents giving rise to isothiouronium salts having a hydrogen ion concentration greater than ten to the minus three moles per liter in aqueous solution. The diamino compounds can be defined as diamino compounds containing from two to three atoms in a saturated chain between the amino groups, said carbon atoms being free of substituents giving rise to diamino compounds having a hydrogen ion concentration greater than ten to the minus three moles per liter in aqueous solution, said carbon atoms, when adjacent to an amino group being free of hydroxyl groups.

The reaction of the isothiouronium salts with the diamino compound is best carried out in a polar hydroxylic solvent such as water or a lower alkanol containing up to five carbon atoms. Methanol and ethanol are particularly useful.

The temperature of the reaction will vary between room temperature and the boiling point of the solvent employed. In the usual case this is between 20° and 140° C. The preferred temperature range is between 60° and 80° C. At atmospheric pressure methyl and ethyl alcohol are preferred solvents since their boiling points are within this preferred range of temperatures.

Although small amounts of the desired materials are undoubtedly formed immediately after mixing the isothiouronium salt and the diamino compound in the chosen solvent, the best yields are obtained if reaction is allowed to continue for periods which may vary from fifteen minutes with the more reactive compounds to as long as twenty-four hours for compounds which react more slowly. The reactivity of most compounds is such that optimum yields are obtained before the end of sixteen hours. With by far the greater majority of the compounds optimum yields can be obtained within ten hours. With very unreactive compounds, for example, those which may be so sterically hindered as to render reaction difficult, a combination of high temperature and extended duration of reaction time may be utilized.

The reaction is best carried out in the absence of mineral acid and may, in certain instances, be aided by the presence of a proton acceptor such as triethylamine, sodium hydroxide, sodium bicarbonate or sodium acetate.

Although it is rarely necessary, the reaction may be carried out using pressure. The pressure may be generated externally, for example, by the use of an inert gas such as nitrogen or it may be generated autogenously, that is, the reaction may be carried out in a closed system with the vapor pressure of the solvent, which increases as the system is heated, serving as the source of pressure for the reaction.

To summarize, the reaction between an isothiouronium halide, sulfate or sulfonate and a diamino compound of this invention takes place best in the absence of mineral acid in a polar hydroxylic solvent such as water or a lower alkanol at a temperature between room temperature and the boiling point of the solvent employed, optimum yields being obtained during a time interval of from fifteen minutes to twenty-four hours depending upon the reactivity of the isothiouronium salt and the diamino compound. The reaction is sometimes aided by the presence of a proton acceptor or the use of pressure.

In one specific embodiment of this reaction 1-naphthyl thiourea (prepared from 1-naphthylamine, ammonium thiocyanate and hydrochloric acid) and methyl iodide are refluxed in methanol for one hour. Most of the solvent is removed in vacuo and a heavy precipitate of the isothiouronium hydriodide salt is formed. The precipitate is collected by filtration and added to an equimolar methanol solution of 1,2-diaminoethane and the mixture refluxed overnight. A part of the solvent is removed in vacuo and the heavy hydriodide salt of 2-(naphthylamino)-1,3-diazacyclopentene-2 precipitates from solution. The hydriodide salt is dissolved in an aqueous solution of an alkaline reagent, such as potassium carbonate and the solution extracted with benzene. The layers are separated and the free base isolated by removal of the organic solvent in vacuo.

The following examples are given by way of illustration only and are not to be construed as limitations of this invention, many variations of which are possible without departing from the spirit or scope thereof.

EXAMPLE I

*N-(1-naphthyl)-S-methylisothiouronium hydriodide*

N-(1-naphthyl)-thiourea (50 g.) and 20 ml. of methyl iodide are refluxed in 200 ml. of methanol for one hour. The solution is cooled and most of the solvent removed in vacuo to give a heavy precipitate of the isothiouronium hydriodide, which is recovered by filtration. The salt is recrystallized from ethanol and melts at 195.4 to 198.4° C.

EXAMPLE II

*2-(1'-naphthylamino)-1,3-diazacyclopentene-2*

The isothiouronium hydriodide of Example I is heated under reflux in an equimolar methanol solution of 1,2-diaminoethane for sixteen hours. The solvent is partially removed in vacuo to precipitate 2-(1'-naphthylamino)-1,3-diazacyclopentene-2 hydriodide; M.P. 239.0° to 242.6° C.

Analysis for $C_{13}H_{14}N_3I$:

|  | Calculated | Found |
| --- | --- | --- |
| Carbon | 46.0 | 46.0 |
| Hydrogen | 4.16 | 4.1 |
| Nitrogen | 12.2 | 12.4 |

The free base is obtained by treating an aqueous solution of the hydriodide with aqueous potassium carbonate, extracting the aqueous solution with methylene chloride, and removing the organic solvent in vacuo. The recrystallized product (methylene chloride-cyclohexene) melts at 153.6 to 155.0° C.

Analysis for $C_{13}H_{13}N_3$:

|  | Calculated | Found |
| --- | --- | --- |
| Carbon | 73.9 | 73.2 |
| Hydrogen | 6.20 | 6.3 |
| Nitrogen | 19.9 | 19.7 |

The hydrochloride salt is prepared by treating an isopropanol solution of the free base with concentrated hydrochloric acid. The solvent is removed in vacuo and the residue recrystallized from isopropanol; M.P. 223.6° to 224.4° C.

Analysis for $C_{13}H_{14}N_3Cl$:

|  | Calculated | Found |
|---|---|---|
| Carbon | 63.0 | 63.1 |
| Hydrogen | 5.7 | 5.4 |
| Nitrogen | 17.0 | 16.9 |
| Chlorine | 14.3 | 14.2 |

EXAMPLE III

*2-(4'-methoxy-1'-naphthylamino)-1,3-diazacyclopentene-2*

N-(4-methoxy-1-naphthyl) thiourea (50 g.) and 20 ml. of methyl bromide are refluxed in 200 ml. of methanol for one hour. The solution is cooled and most of the solvent removed in vacuo. The isothiouronium hydrobromide which is recovered by filtration is taken up in an equimolar methanol solution of 1,2-diaminoethane and heated under reflux for twelve hours. The solvent is partially removed in vacuo to precipitate the hydrobromide salt of 2-(4'-methoxy-1'-naphthylamino)-1,3-diazacyclopentene-2.

The free base is obtained by treating an aqueous solution of the hydrobromide with aqueous potassium carbonate, extracting the aqueous solution with ethylene chloride and removing the organic solvent in vacuo.

EXAMPLE IV

*2-(6'-methoxy-1'-naphthylamino)-1,3-diazacyclopentene-2*

This compound is prepared from N-(6-methoxy-1-naphthyl) thiourea, methyl bromide and 1,2-diaminoethane using the procedure of the previous example.

EXAMPLE V

*2-(4'-methyl-1'-naphthylamino)-1,3-diazacyclopentene-2*

N-(4-methyl-1-naphthyl) thiourea (50 g.) and 20 ml. of methyl iodide are refluxed in 200 ml. of methanol for one hour. The solution is cooled and most of the solvent removed in vacuo. The isothiouronium hydriodide which is recovered by filtration is taken up in an equimolar methanol solution of 1,2-diaminoethane and heated under reflux for ten hours. The solvent is partially removed in vacuo and the hydriodide salt of 2-(4'-methyl-1'-naphthylamino)-1,3 - diazacyclopentene-2 recovered by filtration.

The free base is obtained by treating an aqueous solution of the hydriodide in an aqueous carbonate, extracting the aqueous solution with benzene and removing the organic solvent in vacuo.

EXAMPLE VI

*2-(1'-naphthylamino)-4-hydroxy-1,3-diazacyclohexene-2 hydriodide*

2-(1-naphthyl) thiourea (50 g.) and 20 ml. of methyl iodide are refluxed in 200 ml. of methanol for one hour. The solution is cooled and most of the solvent removed in vacuo. The isothiouronium hydriodide which is recovered by filtration is taken up in an equimolar methanol solution of 1,3-diamino-2-hydroxypropane and heated under reflux for eight hours. The solvent is partially removed in vacuo to precipitate the hydriodide salt of 2-(1'-naphthylamino)-4 - hydroxy - 1,3 - diazacyclohexene-2; M.P. 228.2 to 230° C.

Analysis for $C_{14}H_{16}N_3OI$:

|  | Calculated | Found |
|---|---|---|
| Carbon | 45.8 | 45.5 |
| Hydrogen | 4.41 | 4.4 |
| Nitrogen | 11.2 | 11.4 |
| Iodine | 34.2 | 34.4 |

EXAMPLE VII

*2-(2'-naphthylamino)-1,3-diazacyclopentene-2 hydriodide*

N-(2-naphthyl) thiourea (50 g.) and 20 ml. of methyl iodide are refluxed in 200 ml. of methanol for one hour. The solution is cooled and most of the solvent removed in vacuo. The isothiouronium hydriodide which precipitates is taken up in an equimolar propanol solution of 1,2-diaminoethane and heated under reflux for fourteen hours. The solvent is partially removed in vacuo to precipitate the hydriodide salt; M.P. 251.4 to 253.8° C.

EXAMPLE VIII

*2-(N-propyl-1'-naphthylamino)-1,3-diazacyclopentene-2*

N-propyl-N-(1-naphthyl) thiourea (50 g.) and 17 ml. of methanesulfonic acid are refluxed in 200 ml. of methanol for one hour. The solution is cooled and most of the solvent removed in vacuo. The isothiouronium salt which is recovered by filtration is taken up in an equimolar methanol solution of 1,2-diaminoethane and heated under reflux for ten hours. The solvent is partially removed in vacuo to precipitate the acid addition salt of 2-(N-propyl-1'-naphthylamino)-1,3-diazacyclopentene-2.

The free base is obtained by treating an aqueous solution of the hydrobromide with aqueous potassium carbonate, extracting the aqueous solution with carbon tetrachloride and removing the organic solvent in vacuo.

EXAMPLE IX

*2-(2',4'-dithiomethyl-1'-naphthylamino)-1,3-diazacyclopentene-2 hydrobromide*

N-(2,4-dithiomethyl-1-naphthyl)-thiourea (50 g.) and 20 ml. of methyl bromide are refluxed in 200 ml. of methanol for one hour. The solution is cooled and most of the solvent removed in vacuo. The isothiouronium hydrobromide which is recovered by filtration is taken up in an equimolar ethanol solution of 1,2-diaminoethane and heated under reflux for eight hours. The solvent is partially removed in vacuo to precipitate the hydrobromide salt of 2-(2',4'-dithiomethyl-1-naphthylamino)-1,3-diazacyclopentene-2.

EXAMPLE X

*2-(3',4'-dimethyl-2'-naphthylamino)-1,3-diazacyclohexene-2 sulfate*

N-(3',5'-dimethyl-2-naphthyl) thiourea (50 g.) and 20 ml. of dimethyl sulfate are refluxed in 200 ml. of methanol for one hour. The solution is cooled and most of the solvent removed in vacuo. The isothiouronium sulfate which is recovered by filtration is taken up in an equimolar methanol solution of 1,3-diaminopropane and heated under reflux for twelve hours. The solvent is partially removed in vacuo to precipitate the sulfate salt of 2-(3',5'-dimethyl-2'-naphthyl)-1,3-diazacyclohexene.

EXAMPLE XI

*2-(2,5'-dichlorophenylamino)-1,3-diazacyclopentene-2*

N-(2,5-dichlorophenyl)-thiourea (50 g.) and 20 ml. of methyl iodide are refluxed in 200 ml. of methanol for one hour. The solution is cooled and most of the solvent removed in vacuo to precipitate the isothiouronium hydriodide which is recovered by filtration; M.P. 189 to 191° C. The isothiouronium salt is taken up in an equimolar methanol solution of 1,2-diaminoethane and heated under reflux for ten hours. The solvent is partially removed in vacuo to precipitate the hydriodide salt of 2-(2',5'-dichlorophenylamino) - 1,3-diazacyclopentene-2; M.P. 275.4 to 277° C.

Analysis for $C_9H_8N_3Cl_2I$:

|  | Calculated | Found |
|---|---|---|
| Carbon | 30.2 | 30.2 |
| Hydrogen | 2.82 | 2.8 |
| Nitrogen | 11.7 | 11.7 |
| Iodine | 35.8 | 35.5 |

EXAMPLE XII

*2-(1'-naphthylamino)-4 (or 5)-methyl-1,3-diazacyclopentene-2 hydriodide*

N-(1'-naphthyl) thiourea (50 g.) and 20 ml. of methyl iodide are refluxed in 200 ml. of methanol for one hour. The solution is cooled and most of the solvent removed in vacuo. The isothiouronium hydriodide which is recovered by filtration is taken up in an equimolar methanol solution of 1,2-diaminopropane and heated under reflux for twelve hours. The solvent is partially removed in vacuo to precipitate the hydriodide salt of 2-(1'-naphthyl-amino)-4 (or 5)-methyl - 1,3 - diazacyclopentene-2; M.P. 180.2 to 181.8° C.

Analysis for $C_{14}H_{16}N_3I$:

|  | Calculated | Found |
|---|---|---|
| Carbon | 47.60 | 47.4 |
| Hydrogen | 4.57 | 4.5 |
| Nitrogen | 11.90 | 11.9 |
| Iodine | 35.93 | 36.0 |

EXAMPLE XIII

*2-(2'-naphthylamino)-1,3-diazacyclohexene-2*

N-(2-naphthyl) thiourea (50 g.) and 20 ml. of n-butyl bromide are refluxed in 200 ml. of methanol for one hour. The solution is cooled and most of the solvent removed in vacuo. The isothiouronium hydrobromide which is recovered by filtration is taken up in an equimolar methanol solution of 1,3-diaminopropane and heated under reflux for twelve hours. The solvent is partially removed in vacuo to precipitate the hydrobromide salt of 2-(2'-naphthylamino) - 1,3 - diazacyclohexene-2.

The free base is obtained by treating an aqueous solution of the hydrobromide with aqueous potassium carbonate, extracting the aqueous solution with methylene chloride and removing the organic solvent in vacuo.

EXAMPLE XIV

*2-(1',2',3',4'-tetrahydro-1'-quinolyl)-1,3-diazacyclopentene-2*

N-thiocarbamido - 1,2,3,4 - tetrahydroquinoline (50 g.) and 20 ml. of methyl iodide are refluxed in 200 ml. of methanol for one hour. The solution is cooled and most of the solvent removed in vacuo to give a heavy precipitate of the isothiouronium hydriodide (M.P. 152.4 to 154.2° C.) which is recovered by filtration. The salt is taken up in an equimolar methanol solution of 1,2-diaminoethane and heated under reflux for ten hours. The solvent is partially removed in vacuo and the hydriodide salt recovered by filtration; M.P. 194.2 to 196.0° C.

Analysis for $C_{12}H_{16}N_3I$:

|  | Calculated | Found |
|---|---|---|
| Carbon | 43.8 | 44.0 |
| Hydrogen | 4.90 | 4.9 |
| Nitrogen | 12.8 | 12.3 |
| Iodine | 28.6 | 38.2 |

The free base is obtained by treating an aqueous solution of the hydriodide with aqueous potassium carbonate, extracting the aqueous solution with ethylene chloride and removing the organic solvent in vacuo.

EXAMPLE XV

*2-(1',2'-3'-4'-tetrahydro-1'-quinolyl)-4 (or 5)-methyl-1,3-diazacyclopentene-2*

Hydriodide thiocarbamido-1,2,3,4 - tetrahydroquinoline (50 g.) and 20 ml. of methyl iodide are refluxed in 200 ml. of methanol for one hour. The solution is cooled and most of the solvent removed in vacuo to give a heavy precipitate of the isothiouronium hydriodide (M.P. 152.4 to 154.2°) which is recovered by filtration. The salt is taken up in an equimolar methanol solution of 1,2-diaminopropane and heated under reflux for ten hours. The solvent is partially removed in vacuo and the hydriodide salt recovered by filtration; M.P. 200.4 to 212.0° C.

Analysis for $C_{13}H_{18}N_3I$:

|  | Calculated | Found |
|---|---|---|
| Carbon | 45.5 | 45.4 |
| Hydrogen | 5.29 | 5.4 |
| Nitrogen | 12.2 | 11.7 |

EXAMPLE XVI

*2-(1',2',3',4'-tetrahydro-6',7'-dimethoxy-2'-isoquinolyl)-1,3-diazacyclopentene-hydrobromide*

N-thiocarbamido-6,7 dimethoxy-1,2,3,4 - tetrahydroisoquinoline (50 g.) and 20 ml. of methyl bromide are refluxed in 200 ml. of methanol for one hour. The solution is cooled and most of the solvent removed in vacuo to give a heavy precipitate of the isothiouronium hydrobromide which is recovered by filtration. The salt is taken up in an equimolar methanol solution of 1,2-diaminoethane and heated under reflux for ten hours. The solvent is partially removed in vacuo and the hydrobromide salt recovered by filtration; M.P. 261.4 to 262.0° C.

Analysis for $C_{14}H_{20}O_2N_3Br$:

|  | Calculated | Found |
|---|---|---|
| Carbon | 49.1 | 48.9 |
| Hydrogen | 5.89 | 5.9 |
| Nitrogen | 12.3 | 12.4 |

EXAMPLE XVII

*2-(1',2',3',4'-tetrahydro-2'-isoquinolyl)-1,3-diazacyclopentene-2*

N-thiocarbamido-1,2,3,4-tetrahydroisoquinoline (50 g.) and 20 ml. of benzyl bromide are refluxed in 200 ml. of methanol for one hour. The solution is cooled and most of the solvent removed in vacuo to give a heavy precipitate of the isothiouronium hydrobromide which is recovered by filtration. The salt is taken up in an equimolar aqueous solution of 1,2-diaminoethane and heated under reflux for twelve hours. The solvent is partially removed in vacuo and the hydrobromide salt recovered by filtration.

The free base is obtained by treating an aqueous solution of the hydrobromide with aqueous potassium carbonate, extracting the aqueous solution with methylene chloride and removing the organic solvent in vacuo.

EXAMPLE XVIII

*2-(1',2',3',4'-tetrahydro-1'-quinolyl)-1,3-diazacyclohexene-2 sulfonate*

N-thiocarbamido - 1,2,3,4 - tetrahydroquinoline (50 g.) and 15 g. of benzenesulfonic acid are refluxed in 200 ml. of methanol for one hour. The solution is cooled and most of the solvent removed in vacuo to give a heavy precipitate of the isothiouronium salt which is recovered by filtration. The salt is taken up in an equimolar propanol solution of 1,3-diaminopropane and heated under reflux for ten hours. The solvent is partially removed in vacuo and the acid addition salt recovered by filtration.

EXAMPLE XIX

2-(1',2',3',4'-tetrahydro-2'-isoquinolyl)-1,3-diazacyclohexene-2

N-thiocarbamido-1,2,3,4-tetrahydroisoquinoline (50 g.) and 20 ml. of methyl iodide are refluxed in 200 ml. of methanol for one hour. The solution is cooled and most of the solvent removed in vacuo to give a heavy precipitate of the isothiouronium hydriodide which is recovered by filtration. The salt is taken up in an equimolar butanol solution of 1,3-diaminopropane and heated under reflux for eight hours. The solvent is partially removed in vacuo and the hydriodide salt recovered by filtration.

The free base is obtained by treating an aqueous solution of the hydriodide with aqueous potassium carbonate, extracting the aqueous solution with methylene chloride and removing the organic solvent in vacuo.

EXAMPLE XX

2-(1',2',3',4'-tetrahydro-6'-chloro-1'-quinolyl)-1,3-diazacyclopentene-2

N-thiocarbamido-6-chlor-1,2,3,4-tetrahydroquinoline (50 g.) and 20 ml. of methyl iodide are refluxed in 200 ml. of methanol for one hour. The solution is cooled and most of the solvent removed in vacuo to give a heavy precipitate of the isothiouronium hydriodide which is recovered by filtration. The salt is taken up in an equimolar methanol solution of 1,2-diaminoethane and heated under reflux for ten hours. The solvent is partially removed in vacuo and the hydrobromide salt recovered by filtration.

The free base is obtained by treating an aqueous solution of the hydriodide with aqueous potassium carbonate, extracting the aqueous solution with methylene chloride and removing the organic solvent in vacuo.

EXAMPLE XXI

2-(1',2',3',4'-tetrahydro-6'-methoxy-1i-quinolyl)-1,3-diazacyclopentene-2

N-thiocarbamido-6-methoxy-1,2,3,4-tetrahydroquinoline (50 g.) and 20 ml. of methyl iodide are refluxed in 200 ml. of methanol for one hour. The solution is cooled and most of the solvent removed in vacuo to give a heavy precipitate of the isothiouronium hydriodide which is recovered by filtration. The salt is taken up in an equimolar pentanol solution of 1,2-diaminoethane and heated under reflux for twelve hours. The solvent is partially removed in vacuo and the hydriodide salt recovered by filtration.

The free base is obtained by treating an aqueous solution of the hydriodide with aqueous potassium carbonate, extracting the aqueous solution with ethylene chloride and removing the organic solvent in vacuo.

EXAMPLE XXII

2-(1',2',3',4'-tetrahydro-6'-fluoro-2'-isoquinolyl)-1,3-diazacyclopentene-2

N-thiocarbamido-6-fluoro-1,2,3,4-tetrahydroisoquinoline (50 g.) and 20 ml. of methyl iodide are refluxed in 200 ml. of methanol for one hour. The solution is cooled and most of the solvent removed in vacuo to give a heavy precipitate of the isothiouronium hydriodide which is recovered by filtration. The salt is taken up in an equimolar methanol solution of 1,2-diaminoethane and heated under reflux for ten hours. The solvent is partially removed in vacuo and the hydriodide salt recovered by filtration.

The free base is obtained by treating an aqueous solution of the hydriodide with aqueous sodium carbonate, extracting the aqueous solution with toluene and removing the organic solvent in vacuo.

EXAMPLE XXIII

2-(1',2',3',4'-tetrahydro-6'-methoxy-2'-isoquinolyl)-1,3-diazacyclopentene-2

N-thiocarbamido-6-methoxy-1,2,3,4-tetrahydroisoquinoline (50 g.) and 20 ml. of methyl iodide are refluxed in 200 ml. of methanol for one hour. The solution is cooled and most of the solvent removed in vacuo to give a heavy precipitate of the isothiouronium hydriodide which is recovered by filtration. The salt is taken up in an equimolar methanol solution of 1,2-diaminoethane and heated under reflux for twelve hours. The solvent is partially removed in vacuo and the hydriodide salt recovered by filtration.

The free base is obtained by treating an aqueous solution of the hydriodide with aqueous potassium carbonate, extracting the aqueous solution with ethylene chloride and removing the organic solvent in vacuo.

EXAMPLE XXIV

2-(1',2',3',4'-tetrahydro-1'-quinolyl)-5-hydroxy-1,3-diazacyclohexene-2 hydriodide N-thiocarbamido-1,2,3,4-tetrahydroquinoline (50 g.) and 20 ml. of methyl iodide are refluxed in 200 ml. of methanol for one hour. The solution is cooled and most of the solvent removed in vacuo to give a heavy precipitate of the isothiouronium hydriodide which is recovered by filtration. The salt is taken up in an equimolar methanol solution of 1,3-diamino-2-hydroxypropane and heated under reflux for ten hours. The solvent is partially removed in vacuo and the hydriodide salt recovered by filtration.

The free base is obtained by treating an aqueous solution of the hydriodide with aqueous potassium carbonate, extracting the aqueous solution with methylene chloride and removing the organic solvent in vacuo.

EXAMPLE XXV

2-(1',2',3',4'-tetrahydro-2'-harmanyl)-1,3-diazacyclopentene-2

2-(N-thiocarbamido)-1,2,3,4-tetrahydro harmane (50 g.) and 15 g. of p-toluenesulfonic acid are refluxed in 200 ml. of methanol for one hour. The solution is cooled and most of the solvent removed in vacuo to give a heavy precipitate of the isothiouronium salt which is recovered by filtration. The salt is taken up in an equimolar methanol solution of 1,2-diaminoethane and heated under reflux for eight hours. The solvent is removed in vacuo and the acid addition salt recovered by filtration.

The free base is obtained by treating an aqueous solution of the hydrobromide with aqueous sodium carbonate, extracting the aqueous solution with chloroform and removing the organic solvent in vacuo.

EXAMPLE XXVI

2-(1',2',3',4'-tetrahydro-6',7'-dibromo-1'-quinolyl)-1,3-diazacyclopentene-2

N-thiocarbamido-6',7'-dibromo-1,2,3,4-tetrahydroquinoline (50 g.) and 20 ml. of methyl iodide are refluxed in 200 ml. of methanol for one hour. The solution is cooled and most of the solvent removed in vacuo to give a heavy precipitate of the isothiouronium hydriodide which is recovered by filtration. The salt is taken up in an equimolar methanol solution of 1,2-diaminoethane and heated under reflux for ten hours. The solvent is partially removed in vacuo and the hydriodide salt recovered by filtration.

The free base is obtained by treating an aqueous solution of the hydriodide with aqueous potassium carbonate, extracting the aqueous solution with methylene chloride and removing the organic solvent in vacuo.

EXAMPLE XXVII

*2-(1',2',3',4'-tetrahydro-5',8'-dibromo-1'-quinolyl-1,3-diazacyclopentene-2*

N - thiocarbamido - 5,8 - dibromo - 1,2,3,4 - tetrahydroquinoline (50 g.) and 20 ml. of methyl iodide are refluxed in 200 ml. of methanol for one hour. The solution is cooled and most of the solvent removed in vacuo to give a heavy precipitate of the isothiouronium hydriodide which is recovered by filtration. The salt is taken up in an equimolar methanol solution of 1,2-diaminoethane and heated under reflux for ten hours. The solvent is partially removed in vacuo and the hydriodide salt recovered by filtration.

The free base is obtained by treating an aqueous solution of the hydriodide with aqueous potassium carbonate, extracting the aqueous solution with methylene chloride and recovering the organic solvent in vacuo.

EXAMPLE XXVIII

*2-(1',2',3',4'-tetrahydro-6',7'-dichloro-2'-isoquinolyl)-1,3-diazacyclohexene-2*

N - thiocarbamido - 6',7' - dichloro - 1,2,3,4 - tetrahydroisoquinoline (50 g.) and 20 ml. of methyl iodide are refluxed in 200 ml. of methanol for one hour. The solution is cooled and most of the solvent removed in vacuo to give a heavy precipitate of the isothiouronium hydriodide which is recovered by filtration. The salt is taken up in an equimolar methanol solution of 1,3-diaminopropane and heated under reflux for ten hours. The solvent is partially removed in vacuo and the hydriodide salt recovered by filtration.

The free base is obtained by treating an aqueous solution of the hydriodide with aqueous potassium carbonate, extracting the aqueous solution with methylene chloride and removing the organic solvent in vacuo.

EXAMPLE XXIX

*2-butylamino-1,3-diazacyclopentene-2*

N-butyl thiourea (50 g.) and 20 ml. of methyl iodide are refluxed in 200 ml. of methanol for one hour. The solution is cooled and most of the solvent removed in vacuo to give a heavy precipitate of the isothiouronium hydriodide which is recovered by filtration. The salt is taken up in an equimolar methanol solution of 1,2-diaminoethane and heated under reflux for ten hours. The solvent is partially removed in vacuo and the hydriodide salt recovered by filtration.

The free base is obtained by treating an aqueous solution of the hydriodide with aqueous potassium carbonate, extracting the aqueous solution with methylene chloride and removing the organic solvent in vacuo. Vacuum distillation of the residue gives 2-(butylamino)-1,3-diazacyclopentene-2. B.P. 140° C. at 0.5 mm. of mercury. A picrate is formed and after a recrystallization from water melts at 173 to 174° C.

EXAMPLE XXX

*2-isobutylamino-1,3-diazacyclopentene-2*

N-isobutyl thiourea (50 g.) and 20 ml. of methyl iodide are refluxed in 200 ml. of methanol for one hour. The solution is cooled and most of the solvent removed in vacuo to give a heavy precipitate of the isothiouronium hydriodide which is recovered by filtration. The salt is taken up in an equimolar methanol solution of 1,2-diaminoethane and heated under reflux for ten hours. The solvent is partially removed in vacuo and the hydriodide salt recovered by filtration.

The free base is obtained by treating an aqueous solution of the hydriodide with aqueous potassium carbonate, extracting the aqueous solution with methylene chloride and removing the organic solvent in vacuo. Vacuum distillation of the residue gives 2-(isobutylamino)-1,3-diazacyclopentene-2, which boils at 144° C. at 0.5 mm. of mercury. A picrate is formed and after recrystallization from water melts at 181 to 182° C.

EXAMPLE XXXI

*2-(amylamino)-1,3-diazacyclopentene-2*

N-amyl thiourea (50 g.) and methyl iodide are refluxed in 200 ml. of methanol for one hour. The solution is cooled and most of the solvent removed in vacuo to give a heavy precipitate of the isothiouronium hydriodide which is recovered by filtration. The salt is taken up in an equimolar methanol solution of 1,2-diaminoethane and heated under reflux for eight hours. The solvent is partially removed in vacuo and the hydriodide salt recovered by filtration.

The free base is obtained by treating an aqueous solution of the hydriodide with aqueous sodium carbonate, extracting the aqueous solution with benzene and removing the organic solvent in vacuo. Vacuum distillation of the residue gives 2-(amylamino)-1,3-diazacyclopentene-2 boiling at 158° C. at 2.1 mm. of mercury. A picrate is formed and after recrystallization from water melts at 154 to 155.5° C.

EXAMPLE XXXII

*2-(benzylamino)-1,3-diazacyclopentene-2*

N-benzyl thiourea (50 g.) and 20 ml. of methyl iodide are refluxed in 200 ml. of methanol for one hour. The solution is cooled and most of the solvent removed in vacuo to give a heavy precipitate of the isothiouronium hydriodide which is recovered by filtration. The salt is taken up in an equimolar methanol solution of 1,2-diaminoethane and heated under reflux for ten hours. The solvent is partially removed in vacuo and the hydriodide salt recovered by filtration; M.P. 146 to 148° C. (acetone).

The free base is obtained by treating an aqueous solution of the hydriodide with aqueous potassium carbonate, extracting the aqueous solution with methylene chloride and removing the organic solvent in vacuo. Vacuum distillation of the residue gives 2-(benzylamino)-1,3-diazacyclopentene-2 boiling at 195° C. at 1 mm. of mercury. A picrate is formed and after recrystallization from acetone melts at 150.5 to 151.5° C.

EXAMPLE XXXIII

*2-(phenylethylamino)-1,3-diazacyclopentene-2*

N-ethyl-N-phenyl thiourea (50 g.) and 20 ml. of methyl iodide are refluxed in 200 ml. of methanol for one hour. The solution is cooled and most of the solvent removed in vacuo. The isothiouronium hydriodide which is recovered by filtration is taken up in an aquimolar methanol solution of 1,2-diaminoethane and heated under reflux for twelve hours. The solvent is partially removed in vacuo to precipitate the hydriodide salt of 2-(phenylethylamino)-1,3-diazacyclopentene-2.

The free base is obtained by treating an aqueous solution of the hydriodide with aqueous potassium carbonate, extracting the aqueous solution with methylene chloride and removing the organic solvent in vacuo; M.P. 186.4 to 186.9° C.

EXAMPLE XXXIV

*2-(benzylamino)-4 (or 6)-methyl-1,3-diazacyclohexene-2*

N-benzyl thiourea (50 g.) and 20 ml. of methyl iodide are refluxed in 200 ml. of methanol for one hour. The solution is cooled and most of the solvent removed in vacuo to give a heavy precipitate of the isothiouronium hydriodide which is recovered by filtration. The salt is taken up in an equimolar methanol solution of 1,3-diaminobutane and heated under reflux for ten hours. The solvent is partially removed in vacuo and the hydriodide salt recovered by filtration.

The free base is obtained by treating an aqueous solution of the hydriodide with aqueous potassium carbonate, extracting the aqueous solution with methylene chloride and removing the organic solvent in vacuo. Vacuum distillation of the residue gives 2-(benzylamino)-4 (or 6)-methyl-1,3-diazacyclohexene-2; B.P. 172 to 175° C. at 0.1 mm. of mercury.

A picrate is formed and after recrystallization from water melts at 128.7 to 129° C.

EXAMPLE XXXV

*2-(cyclohexyl)-1,3-diazacyclopentene-2 hydriodide*

N-cyclohexyl thiourea (50 g.) and 20 ml. of methyl iodide are refluxed in 200 ml. of methanol for one hour. The solution is cooled and most of the solvent removed in vacuo to give a heavy precipitate of the isothiouronium hydriodide which is recovered by filtration. The salt is taken up in an equimolar methanol solution of 1,2-diaminoethane and heated under reflux for ten hours. The solvent is partially removed in vacuo and the hydriodide salt recovered by filtration; M.P. 164–165° C. (absolute ethanol-absolute ether).

EXAMPLE XXXVI

*2-(1'-piperidino)-1,3-diazacyclohexene-2 hydriodide*

N-thiocarbamido-piperidine (50 g.) and 20 ml. of methyl iodide are refluxed in 200 ml. of methanol for one hour. The solution is cooled and most of the solvent removed in vacuo to give a heavy precipitate of the isothiouronium hydriodide which is recovered by filtration. The salt is taken up in an equimolar methanol solution of 1,3-diaminopropane and heated under reflux for ten hours. The solvent is partially removed in vacuo and the hydriodide salt recovered by filtration; M.P. 214 to 215° C. (absolute ethanol).

EXAMPLE XXXVII

*2-(1'-morpholino)-1,3-diazacyclopentene-2 hydriodide*

N-thiocarbamido-morpholine (50 g.) and 20 ml. of methyl iodide are refluxed in 200 ml. of methanol for one hour. The solution is cooled and most of the solvent removed in vacuo to give a heavy precipitate of the isothiouronium hydriodide which is recovered by filtration. The salt is taken up in an equimolar methanol solution of 1,2-diaminoethane and heated under reflux for ten hours. The solvent is partially removed in vacuo and the hydriodide salt recovered by filtration; M.P. 256 to 257° C. (methanol).

EXAMPLE XXXVIII

*2-(1'-azacycloheptenyl)-1,3-diazacyclopentene-2 hydriodide*

N-thiocarbamido-azacycloheptane (50 g.) and 20 ml. of methyl iodide are refluxed in 200 ml. of methanol for one hour. The solution is cooled and most of the solvent removed in vacuo to give a heavy precipitate of the isothiouronium hydriodide which is recovered by filtration. The salt is taken up in an equimolar methanol solution of 1,3-diaminoethane and heated under reflux for ten hours. The solvent is partially removed in vacuo and the hydriodide salt recovered by filtration; M.P. 197 to 198.2° C.

Analysis for $C_9H_{18}N_3I$:

|  | Calculated | Found |
| --- | --- | --- |
| Carbon | 36.6 | 36.8 |
| Hydrogen | 6.15 | 6.1 |
| Nitrogen | 14.2 | 14.1 |

EXAMPLE XXXIX

*2-(4'-chlorobenzylamino)-1,3-diazacyclopentene hydrobromide*

N-(4-chlorobenzyl) thiourea (50 g.) and 20 ml. of methyl bromide are refluxed in 200 ml. of methanol for one hour. The solution is cooled and most of the solvent removed in vacuo to give a heavy precipitate of the isothiouronium hydriodide which is recovered by filtration. The salt is taken up in an equimolar methanol solution of 1,2-diaminoethane and heated under reflux for ten hours. The solvent is partially removed in vacuo and the hydriodide salt recovered by filtration; M.P. 150 to 152° C.

Analysis for $C_{10}H_{13}N_3ClBr$:

|  | Calculated | Found |
| --- | --- | --- |
| Carbon | 41.3 | 41.8 |
| Hydrogen | 4.51 | 4.4 |
| Nitrogen | 14.5 | 14.3 |

EXAMPLE XL

*2-(N-methyl-3',4'-dichlorobenzylamino)-1,3-diazacyclopentene-2 hydriodide*

N-methyl-N-(3,4-dichlorobenzyl)-thiourea and 20 ml. of methyl iodide are refluxed in 200 ml. of methanol for one hour. The solution is cooled and most of the solvent removed in vacuo. The isothiouronium hydriodide which is recovered by filtration is taken up in an equimolar methanol solution of 1,2-diaminoethane and heated under reflux for ten hours. The solvent is partially removed in vacuo to precipitate the hydriodide salt of 2-(N-methyl-3',4'-dichlorobenzylamino)-1,3-diazacyclopentene-2; M.P. 145.6 to 147.4° C.

Analysis for $C_{11}H_{14}Cl_3I$:

|  | Calculated | Found |
| --- | --- | --- |
| Carbon | 41.3 | 41.8 |
| Hydrogen | 4.51 | 4.4 |
| Nitrogen | 14.5 | 14.3 |

EXAMPLE XLI

*2-(N-methyl-3',4'-dichlorobenzylamino)-1,3-diazacyclopentene-2 hydriodide*

N-methyl-N-(3,4-dichlorobenzyl)-thiourea and 20 ml. of methyl iodide are refluxed in 200 ml. of methanol for one hour. The solution is cooled and most of the solvent removed in vacuo. The isothiouronium hydriodide which is recovered by filtration is taken up in an equimolar methanol solution of 1,2-diaminoethane and heated under reflux for ten hours. The solvent is partially removed in vacuo to precipitate the hydriodide salt of 2-(N-methyl-3',4'-dichlorobenzylamino)-1,3-diazacyclopentene-2; M.P. 145.6 to 147.4° C.

Analysis for $C_{11}H_{14}N_3Cl_2I$:

|  | Calculated | Found |
| --- | --- | --- |
| Carbon | 34.2 | 34.2 |
| Hydrogen | 3.65 | 3.6 |
| Nitrogen | 10.9 | 10.9 |

EXAMPLE XLII

*2-(2'-decyleneamino)-1,3-diazacyclohexene-2 hydriodide*

N-(2-decylene) thiourea (50 g.) and 20 ml. of methyl iodide are refluxed in 200 ml. of methanol for one hour. The solution is cooled and most of the solvent removed in vacuo to give a heavy precipitate of the isothiouronium hydriodide which is recovered by filtration. The salt is taken up in an equimolar ethanol solution of 1,3-diaminopropane and heated under reflux for ten hours. The solvent is removed in vacuo and the hydriodide salt recovered by filtration.

EXAMPLE XLIII

*2-(9'-anthranylamino)-1,3-diazacyclopentene-2 hydrobromide*

N-(9-anthranyl) thiourea (50 g.) and 15 ml. of butyl bromide are refluxed in 200 ml. of methanol for one hour. The solution is cooled and most of the solvent removed in vacuo, to give a heavy precipitate of the isothiouronium hydrobromide which is recovered by filtration. The salt is taken up in an equimolar ethanol solution of 1,2-diaminoethane and heated under reflux for ten hours. The solvent is removed in vacuo and the hydrobromide salt recovered by filtration.

EXAMPLE XLIV

*N-(2-methyl-cinnamylamine)-1,3-diazacyclopentene-2 hydrobromide*

α-Methyl cinnamylamine prepared according to the method of Walter (J. Am. Chem. Soc., vol. 74, page 5185) is converted to the thiourea compound by treatment with ammonium thiocyanate in the presence of hydrochloric acid. The thiourea derivative (50 g.) and 15 ml. of butyl bromide was refluxed in 200 ml. of methanol for one hour. The solution is cooled and most of the solvent removed in vacuo to give a heavy precipitate of the isothiouronium hydrobromide which is recovered by filtration. The salt is taken up in an equimolar ethanol solution of 1,2-diaminoethane and heated under reflux for ten hours. The solvent is removed in vacuo and the hydrobromide salt recovered by filtration.

EXAMPLE XLV

*2-(3-hydroxy-16-aminomethyl-30-one-5-pregnenyl)-1,3-diazacyclopentene-2 hydriodide*

3-hydroxy-16-aminomethyl-5-pregnene-20-one prepared according to the method described in U.S. Patent No. 2,727,908 is converted to a thiourea derivative by reaction with ammonium thiocyanate and hydrochloric acid. It is refluxed for one hour with a slight excess of methyl iodide in methanol solution and the solvent removed in vacuo to precipitate the isothiouronium salt. The isothiouronium salt is refluxed in methanol with an equimolar solution of 1, 2-diaminoethane for ten hours. Most of the solvent is removed in vacuo and the desired product is recovered by filtration.

EXAMPLE XLVI

*2-(N-tetradecyl-hexadecylamino)-1,3-diazacyclopentene hydriodide*

N-tetradecyl-hexadecylamide prepared by reaction between equimolar quantities of hexadecylyl chloride and tetradecylamine is reduced in ether solution with lithium aluminum hydride to give N-tetradecyl-hexadecylamine. The amine is converted to a thiouronium derivative by reaction with ammonium thiocyanate and hydrochloric acid. It is refluxed for one hour with a slight excess of methyl iodide in methanol solution and the solvent removed in vacuo to precipitate the isothiouronium salt. The isothiouronium salt is refluxed in methanol with an equimolar solution of 1,2-diaminoethane for ten hours. Most of the solvent is removed in vacuo and the desired product is recovered by filtration.

What is claimed is:

1. The process for preparing an acid addition salt of 2-(N-substituted)-1,3-diazacycloalkene-2 which comprises reacting, in a polar hydroxylic solvent selected from the group consisting of water and lower alkanols containing up to five carbon atoms at a temperature of from 20 to 140° C., an isothiouronium salt selected from the group consisting of halide, sulfate and sulfonate salts wherein the groups attached to the number one nitrogen atom of said isothiouronium salt are free of acid substituents giving rise to isothiouronium salts having a hydrogen ion concentration greater than ten to the minus three moles per liter in aqueous solution and containing up to a total of thirty carbon atoms, with a diamino compound containing from two to three carbon atoms in a saturated chain between the amino groups, said carbon atoms being free of acid substituents giving rise to diamino compounds having a hydrogen ion concentration of greater than ten to the minus three moles per liter in aqueous solution, said carbon atoms, when adjacent to amino groups being free of hydroxyl groups.

2. The process as in claim 1 wherein resulting acid addition salt is neutralized to obtain the free base.

3. The process as in claim 2 wherein the free base is recovered by extracting the reaction mixture with an organic solvent selected from the group consisting of reaction mixture inert hydrocarbon and halogenated hydrocarbon solvents.

4. The process as in claim 1 wherein the polar hydroxylic solvent is methanol.

References Cited in the file of this patent

Scholz: Industrial and Engineering Chemistry, vol. 37, pp. 120–125 (1945).